United States Patent [19]

Walker

[11] 4,075,478
[45] Feb. 21, 1978

[54] FLOATING HEAD ENCODER

[75] Inventor: Ralph Eldridge Walker, Canoga Park, Calif.

[73] Assignee: Litton Systems, Inc., Beverly Hills, Calif.

[21] Appl. No.: 692,622

[22] Filed: June 3, 1976

[51] Int. Cl.² .............................................. G01D 5/34
[52] U.S. Cl. ................................ 250/231 SE; 250/233
[58] Field of Search ............. 250/231 SE, 231 R, 236, 250/233, 237 G; 360/103; 179/100.3 V

[56] References Cited
U.S. PATENT DOCUMENTS

| 3,770,971 | 11/1973 | Somerset | 250/231 SE |
| 3,815,125 | 6/1974 | May et al. | 250/231 SE |

*Primary Examiner*—Alfred E. Smith
*Assistant Examiner*—David K. Moore
*Attorney, Agent, or Firm*—M. Michael Carpenter

[57] ABSTRACT

An optical encoder design is disclosed which maintains a constant fixed air gap between the commutator and light sensors. The encoder head is mounted on a partially compressed hollow bellows or other spring member biasing snubber posts adjacent to the light sensors against tracks on the commutator. The height of the snubber posts above the light sensors defines the air gap.

8 Claims, 5 Drawing Figures

FLOATING HEAD ENCODER

BACKGROUND OF THE INVENTION

The present invention relates to optical shaft position encoders which are used to generate electrical signals representative of the rotational position of a shaft. Encoders are used typically in control and monitoring systems as position sensors. Optical encoders utilize pairs of light sources amd semsors, such as photocells or other light sensitive devices, separated by transparent commutators arranged for rotation with the shaft and carrying coded opaque patterns for selectively interrupting the light paths according to shaft position.

Optical encoders were developed to avoid the problems resulting from the mechanical wear experienced by brush encoders in which an insulating commutator carries a coded pattern of conductors for selective contact with fixed brushes according to shaft position. The conventional optical encoder is provided with a fixed air gap between the sensors and the commutator pattern thereby avoiding any functional or wear problems.

Optical encoders are capable of great accuracy in sensing position. As the physical size of the commutator increses, the coded pattern may become more complex providing more detailed positional information. One problem associated with larger devices is the difficulty in maintaining the fixed air gap. This is critical to the accuracy of the encoders. The light sources used are not coherent sources so that variations in the air gap dimensions affect the integrity of the output signal.

In the newly emerging field of solar energy processing, an application for encoders has developed in which the maintenance of a constant air gap is a particular problem. In positioning large mirrors for directing reflected sun light against a target, such as a heat exchanger, high precision encoders are required. The mirrors are physically large, on the order of 400 square feet or more and are not protected from the winds. The torque effects of a strong wind on such a surface make it difficult to accurately maintain a small air gap, on the order of 0.005 inch, between a commutator mounted to the mirror and an optical head fastened to a mechanical base. In a conventional encoder these tolerance problems require the utilization of expensive optically flat glass.

SUMMARY OF THE INVENTION

The optical encoder design of the present invention provides a fixed air gap not so susceptable to the effects of loading on the shaft whose position is to be sensed. Snubber posts of a low friction and long wearing material are mounted on the optical head and contact the commutator along tracks to the side of the coded pattern. The snubber posts serve to maintain the constant air gap. Less expensive plate glass may be used for the commutator as a result of the constant air gap design.

In one embodiment, the optical head is mounted on a spring member, such as a bellows, which presses the optical sensors against the commutator while preventing or at least minimizing radial and tangential deflections.

BRIEF DESCRIPTION OF THE DRAWINGS

FIG. 1 is a cross sectional view of the optical head of FIG. 2 taken along line AA.

DETAILED DESCRIPTION OF A PREFERRED EMBODIMENT

Figure 1:
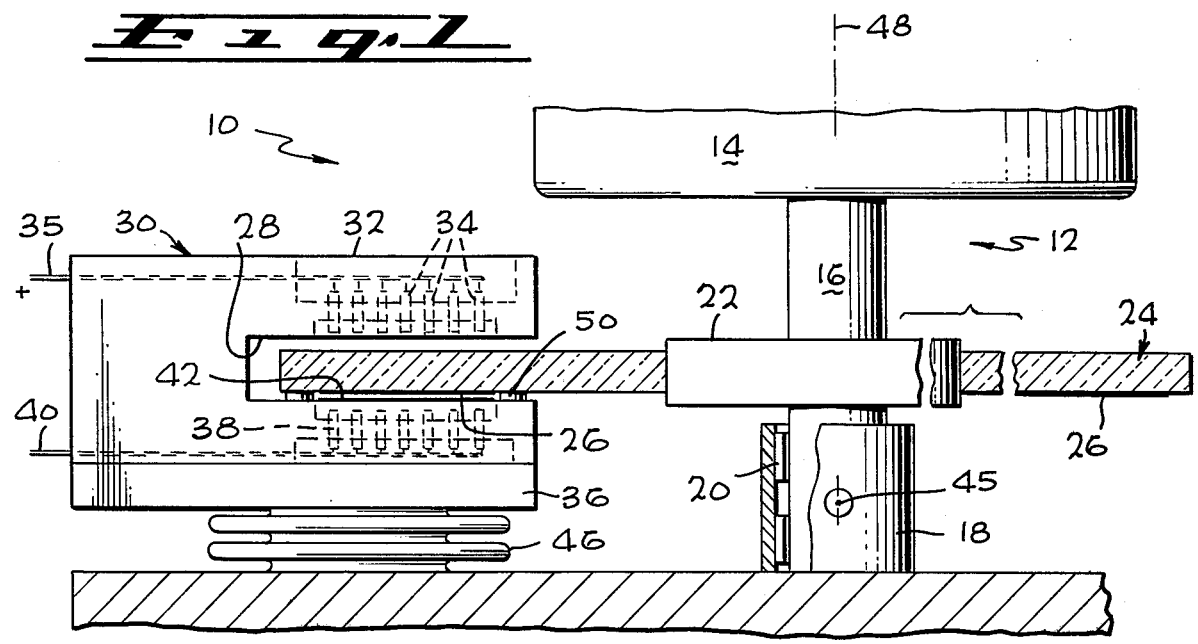
FIG. 1 is a side view in cross section of a floating head encoder according to the instant invention including the shaft and load with which the encoder is utilized.

Optical encoder 10, according to the instant invention, is shown in FIG. 1 together with load 12, the position of which is to be determined. To illustrate the problem of maintaining a constant air gap under conditions of variable high torque, load 12 is shown as solar mirror 14 mounted on shaft 16. Housing 18 supports the shaft on bearing 20. Mirror 14 may present a surface area on the order of 400 square feet and be subject to winds of 50 m.p.h. Shaft 16 could conveniently be a 7 inch diameter steel shaft.

Securely mounted to shaft 16 by means of collar 22 is commutator 24 of the encoder. Commutator 24 may conveniently be constructed of plate glass having a coded opaque pattern 26 affixed to the lower surface thereof as will be described in greater detail hereinbelow with reference to FIG. 3. Commutator 24 rotates with shaft 16 and moves within opening 28 of optical head 30 as shown. The upper portion of head 30 is source block 32 which contain a series of optical sources, such as light emitting diodes, LEDs 34, which are connected to a constant source of power not shown, through cable 35. LEDs 34 are arranged to provide light, at selected locations, to pass through transparent commutator 24. Source block 32 forms the upper surface of opening 28.

Figure 1A:
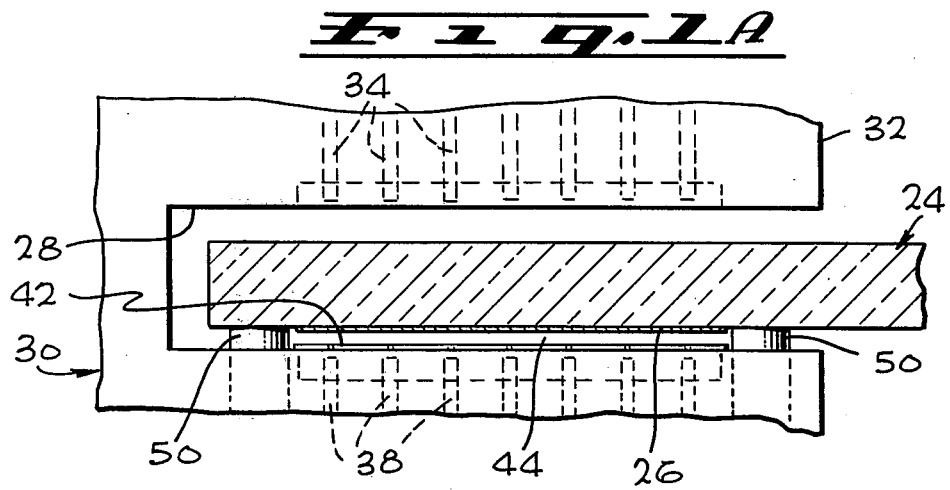
FIG. 1A is an enlarged view of the area surrounding air gap 44 of FIG. 1.

The lower surface of opening 28 is formed by sensor block 36 which contains a series of optical sensors 38, arranged individually to receive the light from a selected LED 34. The light paths from source to sensor are interrupted by portions of coded pattern 26 according to the position of shaft 16. The electrical position signal provided on sensor cable 40 is determined by the position of pattern 26 with respect to sensors 38. An optical slit mask 42 is positioned immediately above sensors 38 to minimize inaccuracies. Air gap 44 is measured between the upper surface of mask 42 and the lower surface of pattern 26 as may be clearly seen in FIG. 1A.

The integrity of the light signal received by sensor 38, and therefor the position signal on sensor cable 40, is in part dependent upon air gap 44. As an opaque portion of coded pattern 26 is rotated past a particular sensor, the sensor output changes from on, indicating that light is being received, to off indicating that an opaque portion of coded pattern 26 is interrupting the light path. The transition accuracy is controlled by the distance between pattern 26 and sensor 38. The smaller the air gap, the sharper the transition. This results in greater accuracy in determining the position of the shaft 16.

In conventional devices, optical head 30 would be rigidly mounted to housing 18. Forces applied to load 12, such as wind forces applied to mirror 14, could cause shaft 16 to rotate about axis 45. This would cause the portion of commutator 24 within opening 28 to move up or down changing air gap 44 and degrading the performance of encoder 10 and potentially damaging components thereof.

To prevent such rotation from effecting performance, optical head 30 is mounted on a special spring member, such as bellows 46, which is mounted to housing 18. The important characteristics of the spring member are that axial motion is restricted by the spring rate of the member while tangential and radial deflection is minimized. The term axial motion refers herein to motion along axis 48 of shaft 16. The term radial deflection is used herein to mean motion in a direction along a radius of shaft 16 and the term tangential deflection is used herein to mean motion along a direction tangential to such a radius.

Under normal conditions bellows 46 is partially compressed by commutator 24 which presses against low friction snubber posts 50 in sensor block 36. Snubber posts 50 may conveniently be constructed from a plastic material containing a substantial percentage of graphite. As will be explained hereinbelow with reference to FIG. 3, snubber posts 50 contact commutator 24 along clear tracks, parallel to and outside of coded pattern 26. The partially compressed condition of bellows 46 forces sensor block 36 against commutator 24 maintaining a constant air gap 44, defined by the height of snubber posts 50 above mask 42, even if commutator 24 is caused to rotate about axis 45. Tangential and radial motion of optical head 30, which would otherwise introduce inaccuracies, is prevented.

Figure 2:
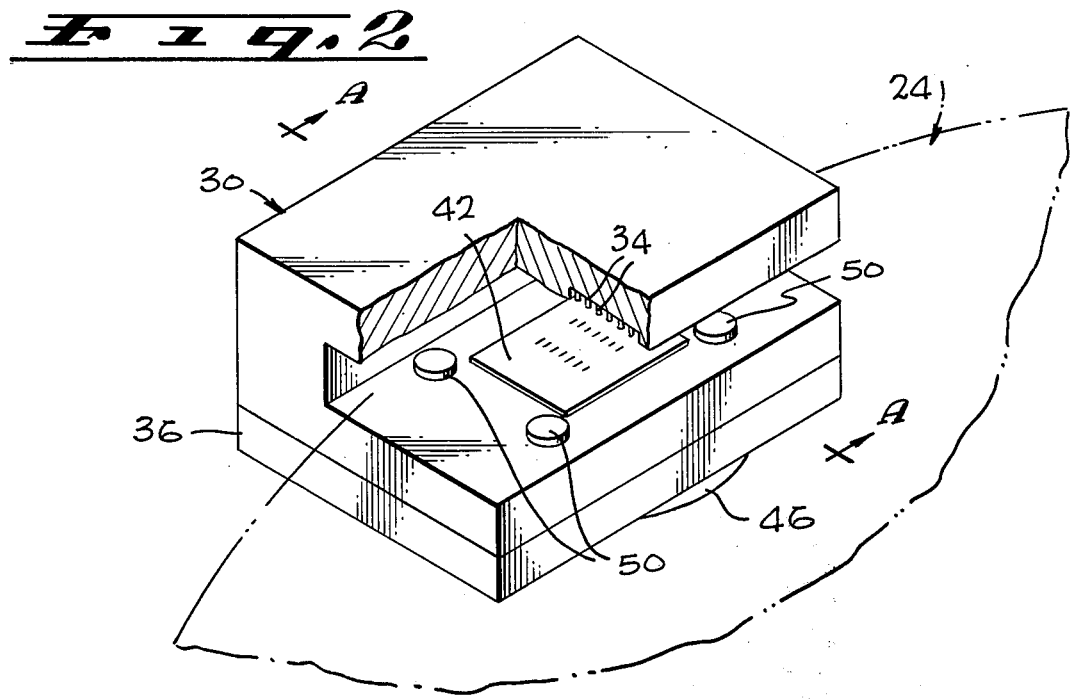
FIG. 2 is an isometric view of the optical head of the encoder, shown partially cut away to expose the optical sensor mask and snubber posts.

FIG. 2 is a partial cut away perspective view of optical head 30 shown for clarity. Bellows 46 can be seen in part supporting sensor block 36 which is shown complete. Mounted on sensor block 36 in the center thereof and in the path of coded pattern 26 is slitted mask 42. Sensors 38 cannot be seen in this Figure but are positioned immediately behind the slits shown in mask 42. Snubber posts 50 are shown mounted on sensor block 36 surrounding mask 42. Each snubber post is mounted so that they all extend an equal and fixed distance above the upper surface of mask 42. This extension defines and controls air gap 44 shown in FIG. 1. Source block 32 is shown partially cut away to expose sources 34 which are aligned with the slits. Line AA shows where optical head 30 of FIG. 2 is cross sectioned to develop the view shown in FIG. 1.

Figure 3:
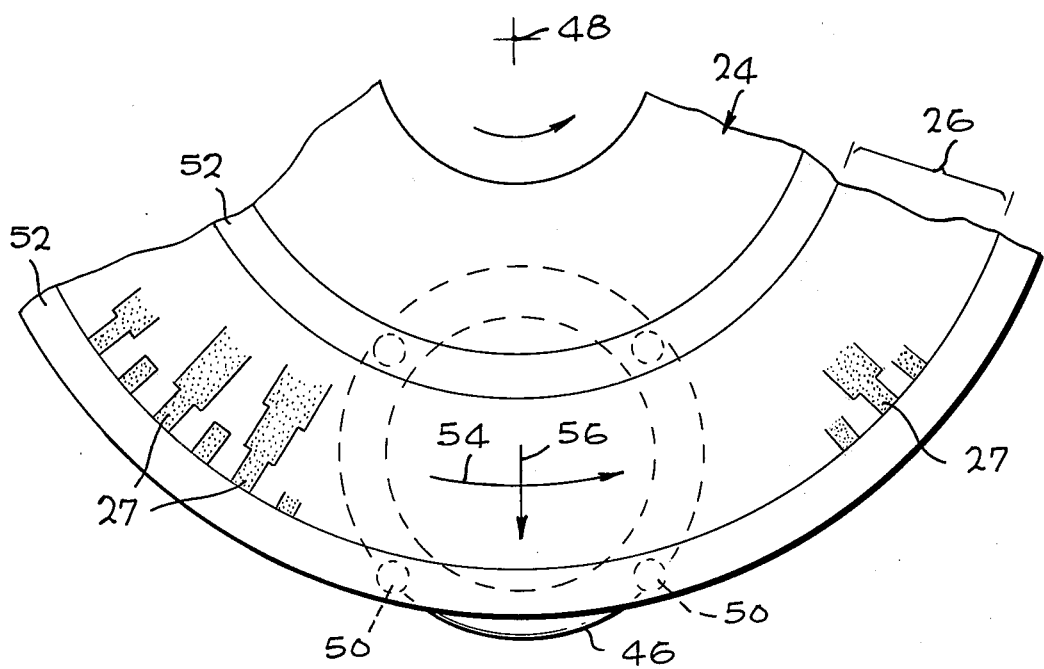
FIG. 3 is a partial top view of the commutator of the instant invention showing a portion of the coded pattern and the relationship of the bellow, snubber posts and the tracks.

FIG. 3 is a partial top view of commutator 24 conveniently constructed of plate glass. Coded pattern 26 is shown thereon in outline except for portion 27 shown in greater detail. The coded pattern design used depends upon the particular application and may be any one of a great number of conventional designs. Coded pattern 26 may conveniently be a metalized layer on the bottom surface of commutator 24. On either side of pattern 26 are visible clear tracks 52 which may simply be areas of no pattern exposing the glass surface or other specially prepared surface against which snubber posts 50 of source block 36 must slide. Bellows 46 is shown below commutator 24 together with snubber posts 50 to illustrate their positioning with respect to tracks 52 and pattern 26. Also shown superimposed upon the outline of bellow 46 are tangential arrow 54 and radial arrow 56 representing the directions of deflection restricted by design of the spring member used such as bellows 46. Both tangential and radial deflections are in the plane of commutator 24.

Figure 4:
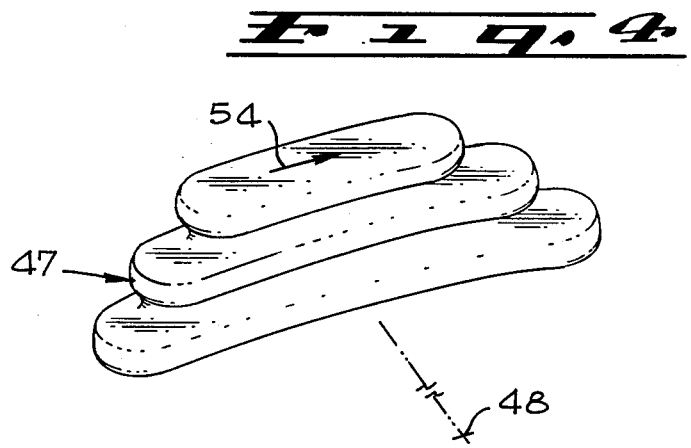
FIG. 4 is an isometric view of an alternate bellows configuration.

FIG. 4 shows an alternate construction 47 of the spring member which is, in effect, a bellows of oval cross section. This construction increases the resistance to tangential deflection of the spring member. The short axis of the elipse is along a radial of shaft 16.

I claim:

1. An improved optical encoder for generating an electrical signal representative of the rotational position of a shaft, of the type having
    a non-rotating optical head including light sources and light sensors connected by light paths,
    a commutator including a coded pattern thereon mounted for rotation with the shaft through the light paths, wherein the improvement comprises:
    snubber means mounted to the optical head for contact with the commutator to maintain a constant air gap between the coded pattern and the optical head, and
    means for urging the commutator and snubber posts into contact with each other.

2. The improved optical encoder claimed in claim 1 wherein the snubber means comprises:
    snubber posts projecting above the light sensors a predetermined distance.

3. The improved optical encoder claimed in claim 2 wherein the snubber posts are constructed of a plastic material including a substantial percentage of graphite.

4. The improved optical encoder claimed in claim 2 wherein the commutator includes on one surface thereof clear tracks for sliding contact with the snubber posts.

5. The improved optical encoder claimed in claim 1 wherein the means for urging comprises:
    a partially compressed spring member for supporting the optical head, the spring member permitting axial motion while minimizing tangential and radial deflection of the head.

6. The improved optical encoder claimed in claim 5 wherein the spring member is a hollow bellows.

7. The improved optical encoder claimed in claim 6 wherein the bellows has a round cross section.

8. The improved optical encoder claimed in claim 6 wherein the bellows has an elliptical cross section, the short axis of the ellipse being along a radial of the shaft.

* * * * *